(12) United States Patent
Zhang et al.

(10) Patent No.: US 9,433,059 B2
(45) Date of Patent: Aug. 30, 2016

(54) BOOST CIRCUITS, LED BACKLIGHT DRIVING CIRCUITS AND LIQUID CRYSTAL DEVICES

(71) Applicant: Shenzhen China Star Optoelectronics Technology Co., Ltd., Shenzhen, Guangdong (CN)

(72) Inventors: Hua Zhang, Guangdong (CN); Fei Li, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 4 days.

(21) Appl. No.: 14/371,727

(22) PCT Filed: Jun. 26, 2014

(86) PCT No.: PCT/CN2014/080817
§ 371 (c)(1),
(2) Date: Jul. 10, 2014

(87) PCT Pub. No.: WO2015/192388
PCT Pub. Date: Dec. 23, 2015

(65) Prior Publication Data
US 2015/0366031 A1    Dec. 17, 2015

(30) Foreign Application Priority Data

Jun. 17, 2014 (CN) .......................... 2014 1 0270602

(51) Int. Cl.
*H05B 37/02* (2006.01)
*G02F 1/1335* (2006.01)
*H02M 3/156* (2006.01)
(Continued)

(52) U.S. Cl.
CPC .............. *H05B 37/02* (2013.01); *G09G 3/342* (2013.01); *H02M 3/158* (2013.01); *G02F 1/133603* (2013.01); *G09G 2320/064* (2013.01);
(Continued)

(58) Field of Classification Search
None
See application file for complete search history.

(56) References Cited

U.S. PATENT DOCUMENTS 5,617,015 A * 4/1997 Goder ....................... G05F 1/56
323/282
6,075,295 A * 6/2000 Li ........................ H02M 3/158
307/38

(Continued)

FOREIGN PATENT DOCUMENTS

CN         1578081 A        2/2005

*Primary Examiner* — Crystal L Hammond
(74) *Attorney, Agent, or Firm* — Andrew C. Cheng

(57) ABSTRACT

A boost circuit includes an inductor (L), a MOS transistor (Q), and a number "n" of switch components (Q1-Qn) is disclosed. A first end of the inductor (L) receives an input voltage (Vin), and a second end of the inductor (L) connects to a drain of the MOS transistor (Q). A source of the MOS transistor (Q) is electrically grounded, and a gate of the MOS transistor (Q) is driven by one square-wave signals (S). The number "n" of switch components respectively connects to the inductor and respectively outputs a number "n" of output voltages. The number "n" of switch components are driven by a number "n" of square-wave signals (S1-Sn). A duty ratio of the square-wave signals (S) is d, and the duty ratios of the square-wave signals (S1-Sn) are d1-dn. Before a turn-off time of each period of the MOS transistor (Q), the number "n" of square-wave signals (S1-Sn) are driven by a number "n" of switch components (Q1-Qn) in turn. Wherein d1+d2+d3+ . . . +dn=1−d, and n is an integer greater than one. In addition, a LED backlight driving circuit and a liquid crystal device having the above boost circuit are disclosed.

18 Claims, 3 Drawing Sheets

(51) Int. Cl.
  *H02M 3/158* (2006.01)
  *G09G 3/34* (2006.01)
  *H02M 1/00* (2006.01)
(52) U.S. Cl.
  CPC .. *G09G2330/024* (2013.01); *H02M 2001/009* (2013.01); *Y10T 307/406* (2015.04)

(56) References Cited

U.S. PATENT DOCUMENTS

| | | | | |
|---|---|---|---|---|
| 6,369,551 | B1 * | 4/2002 | Blumenkrantz | G05F 1/46 323/222 |
| 6,437,545 | B2 * | 8/2002 | Sluijs | H02M 3/1584 323/222 |
| 6,900,620 | B2 * | 5/2005 | Nishimori | H02M 3/158 323/222 |
| 7,176,661 | B2 * | 2/2007 | Kranz | H02M 3/158 323/222 |
| 7,378,823 | B2 * | 5/2008 | Yamanaka | H02J 1/08 323/222 |
| 2001/0011885 | A1 * | 8/2001 | Nakagawa | H02M 1/34 323/224 |
| 2003/0086282 | A1 * | 5/2003 | Zeng | H02M 3/33592 363/95 |
| 2005/0231177 | A1 * | 10/2005 | Tateno | H02M 3/1588 323/225 |
| 2007/0242487 | A1 * | 10/2007 | Orr | H02M 3/335 363/21.12 |
| 2008/0122291 | A1 * | 5/2008 | Uchimoto | H02M 3/1584 307/31 |
| 2010/0013395 | A1 * | 1/2010 | Archibald | H05B 33/0827 315/185 R |
| 2010/0019807 | A1 * | 1/2010 | Zhang | H03K 17/145 327/109 |
| 2010/0177536 | A1 * | 7/2010 | Liu | H02M 3/33592 363/17 |
| 2012/0200231 | A1 * | 8/2012 | Esaki | H05B 33/0818 315/210 |
| 2013/0002162 | A1 * | 1/2013 | Gao | H05B 33/0824 315/210 |
| 2013/0127348 | A1 * | 5/2013 | Yang | H05B 33/0809 315/186 |

* cited by examiner

BOOST CIRCUITS, LED BACKLIGHT DRIVING CIRCUITS AND LIQUID CRYSTAL DEVICES

BACKGROUND OF THE INVENTION

1. Field of the Invention

The present disclosure relates to boost circuit technology, and more particularly to a boost circuit having one input voltage and a plurality of output voltages, the LED backlight driving circuit with the boost circuit, and the liquid crystal device (LCD) with the LED backlight driving circuit.

2. Discussion of the Related Art

With the technology revolution, backlight technology of LCDs has been developed. Typical LCDs adopt cold cathode fluorescent lamps (CCFL) as the backlight sources. However, as the CCFL backlight is characterized by attributes including low color reduction ability, low lighting efficiency, high discharging voltage, bad discharging characteristics in low temperature, and also, the CCFL needs a long time to achieve a stable gray scale, LED backlight source is a newly developed technology. For LCDs, the LED backlight source is arranged opposite to the liquid crystal panel so as to provide the light source to the liquid crystal panel. The LED backlight source includes at least one LED string, and each of the LED strings includes a plurality of LEDs serially connected.

FIG. 1 is a circuit diagram of a driving circuit for LED backlight sources of LCDs ("driving circuit"). As shown, the driving circuit includes a boost circuit having an inductor (L), a rectifying diode (D), a Metal-Oxide-Semiconductor (MOS) transistor (Q), and a capacitor (C). One end of the capacitor (C) receives an input voltage (Vin), and the other end of the inductor (L) connects to a positive end of the rectifying diode (D1) and to a drain of the MOS transistor (Q). The gate of the MOS transistor (Q) is driven by a square-wave signals (S), and the drain of the MOS transistor (Q) is electrically grounded. A negative end of the rectifying diode (D) obtains the output voltage (Vo) for providing to the LED string. The negative end of the rectifying diode (D) is electrically grounded via the capacitor (C).

The duty ratio of the square-wave signals (S) of the above driving circuit is d. The relationship between the output voltage (Vo) and the input voltage (Vin) is:

$$Vo = Vin \times \frac{1}{1-d}.$$

In addition to the high voltage needed for the LED string, the driving circuits usually need more converted voltage. For instance, the voltage needed for the operations of the driving circuit ("VCC"), the reference voltage (Vref), and so on. Currently, a single boost line can only obtain one output voltage.

SUMMARY

In order to overcome the above problem, the LED backlight driving circuit includes a boost circuit having one input voltage and a plurality of output voltages.

In one aspect, a boost circuit includes: an inductor (L), a MOS transistor (Q), and a number "n" of switch components (Q1-Qn), a first end of the inductor (L) receives an input voltage (Vin), and a second end of the inductor (L) connects to a drain of the MOS transistor (Q), a source of the MOS transistor (Q) is electrically grounded, a gate of the MOS transistor (Q) is driven by one square-wave signals (S), the first ends of the number "n" of switch components (Q1-Qn) respectively connects to the second end of the inductor (L), the second ends of the number "n" of switch components (Q1-Qn) respectively outputs a number "n" of output voltages (Vo1-Von), the number "n" of switch components (Q1-Qn) are driven by a number "n" of square-wave signals (S1-Sn); wherein a duty ratio of the square-wave signals (S) is d, the duty ratios of the square-wave signals (S1-Sn) are d1-dn, before a turn-off time of each period of the MOS transistor (Q), the number "n" of square-wave signals (S1-Sn) are driven by a number "n" of switch components (Q1-Qn) in turn, and d1+d2+d3+ . . . +dn=1−d; and wherein n is an integer greater than one.

Wherein the number "n" of switch components (Q1-Qn) are MOS transistors, the drain of each MOS transistors (Q) respectively connects to the second ends of the inductor (L), the source of each MOS transistors (Q) respectively outputs the number "n" of output voltages (Vo1-Von), and the gate of the MOS transistors (Q) are respectively driven by the number "n" of square-wave signals (S1-Sn).

Wherein n is in a range between 2 and 4.

wherein n equals to 2.

In another aspect, a LED backlight driving circuit includes a boost circuit and at least one LED loading. The boost circuit includes: an inductor (L), a MOS transistor (Q), and a number "n" of switch components (Q1-Qn), a first end of the inductor (L) receives an input voltage (Vin), and a second end of the inductor (L) connects to a drain of the MOS transistor (Q), a source of the MOS transistor (Q) is electrically grounded, a gate of the MOS transistor (Q) is driven by one square-wave signals (S), the first ends of the number "n" of switch components (Q1-Qn) respectively connects to the second end of the inductor (L), the second ends of the number "n" of switch components (Q1-Qn) respectively outputs a number "n" of output voltages (Vo1-Von), the number "n" of switch components (Q1-Qn) are driven by a number "n" of square-wave signals (S1-Sn), one of the number "n" of output voltages (Vo1-Von) supplies a driving voltage to the LED loading, and other output voltages supply the driving voltages to other loadings of the LED backlight driving circuit; wherein a duty ratio of the square-wave signals (S) is d, the duty ratios of the square-wave signals (S1-Sn) are d1-dn, before a turn-off time of each period of the MOS transistor (Q), the number "n" of square-wave signals (S1-Sn) are driven by a number "n" of switch components (Q1-Qn) in turn, and d1+d2+d3+ . . . +dn=1−d; and wherein n is an integer greater than one.

Wherein the LED loading is a LED string or at least two LED strings connected in parallel, and each of the LED string comprises a plurality of LEDs serially connected.

In another aspect, a liquid crystal device includes a liquid crystal panel and a backlight module for providing a display light source to the liquid crystal panel such that the liquid crystal panel is capable of displaying images. The backlight module comprises a LED backlight source having the above LED backlight driving circuit.

In view of the above, the LED backlight driving circuit includes one boost circuit having one input voltage and a plurality of output voltages. Only one energy-saving component is adopted, but two or more output voltages may be obtained. Not only the LED string is supplied with the voltage, but also other loadings of the driving circuit may be supplied with the operational voltage. In this way, it is not needed to adopt large-scale energy-saving component, i.e., inductor, such that the cost of the product is reduced.

DETAILED DESCRIPTION OF THE EMBODIMENTS

Embodiments of the invention will now be described more fully hereinafter with reference to the accompanying drawings, in which embodiments of the invention are shown.

Figure 1:
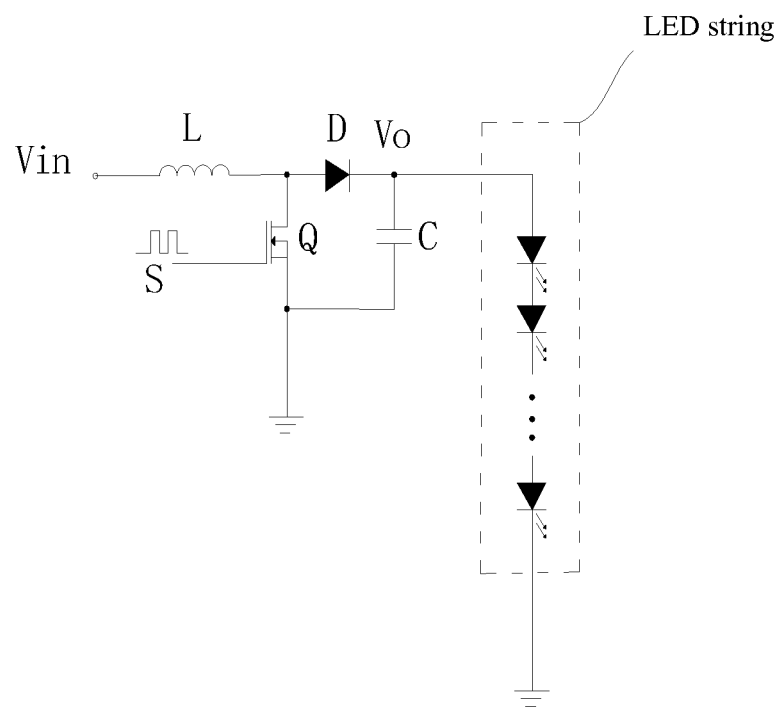
FIG. 1 is a circuit diagram of a conventional driving circuit for LED backlight sources of LCDs.
Figure 2:
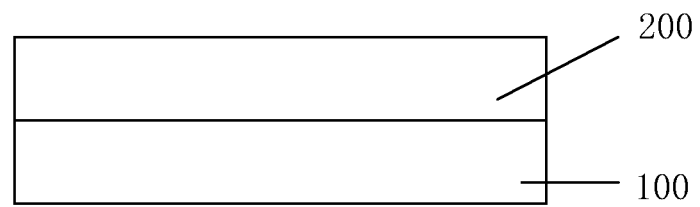
FIG. 2 is a schematic view of the LCD in accordance with one embodiment.

As shown in FIG. 2, the LCD includes a liquid crystal panel 200 and a backlight module 100 for providing a display light source to the liquid crystal panel 200 such that the liquid crystal panel 200 may display images. The backlight module 100 includes a LED backlight source.

The driving circuit of the LED backlight source includes a boost circuit for converting an input voltage to a plurality of output voltages so as to provide operational voltages to a plurality of loadings, such as the LED string, the operational voltage (Vcc), the reference voltage (Vref), and so on, of the driving circuit.

Figure 3:
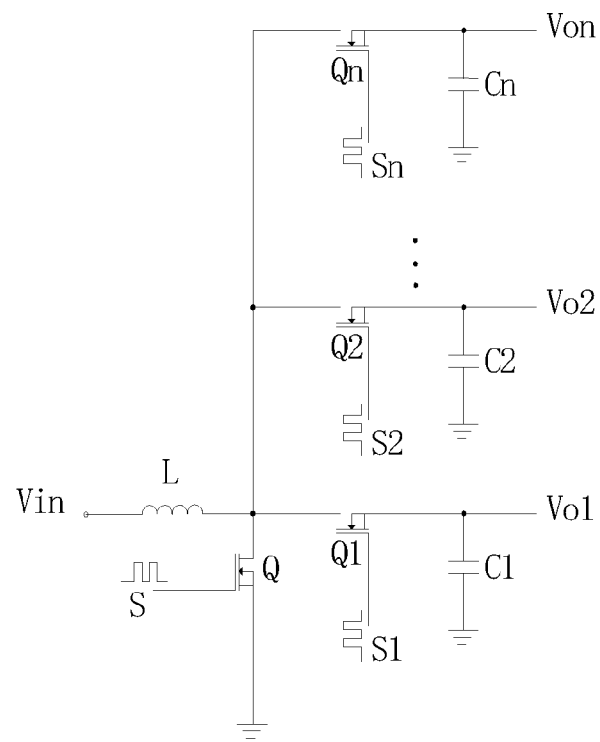
FIG. 3 is a circuit diagram of the boost circuit in accordance with one embodiment.

As shown in FIG. 3, the boost circuit includes an inductor (L), a MOS transistor (Q), and a number "n" of switch components (Q1-Qn). A first end of the inductor (L) receives an input voltage (Vin), and a second end of the inductor (L) connects to the drain of the MOS transistor (Q). The source of the MOS transistor (Q) is electrically grounded. The gate of the MOS transistor (Q) is driven by one square-wave signals (S). The first ends of the number "n" of switch components (Q1-Qn) respectively connects to the second end of the inductor (L). The second ends of the number "n" of switch components (Q1-Qn) respectively outputs a number "n" of output voltages (Vo1-Von). The number "n" of switch components (Q1-Qn) are driven by a number "n" of square-wave signals (S1-Sn). N is an integer greater than one.

In the embodiment, the number "n" of switch components (Q1-Qn) are MOS transistors. The drain of each MOS transistors (Q) respectively connects to the second ends of the inductor (L). The source of each MOS transistors (Q) respectively outputs the number "n" of output voltages (Vo1-Von). The gate of the MOS transistors (Q) are respectively driven by the number "n" of square-wave signals (S1-Sn). The source of each MOS transistors (Q) are electrically grounded respectively via one capacitor (C1-Cn).

Figure 4:
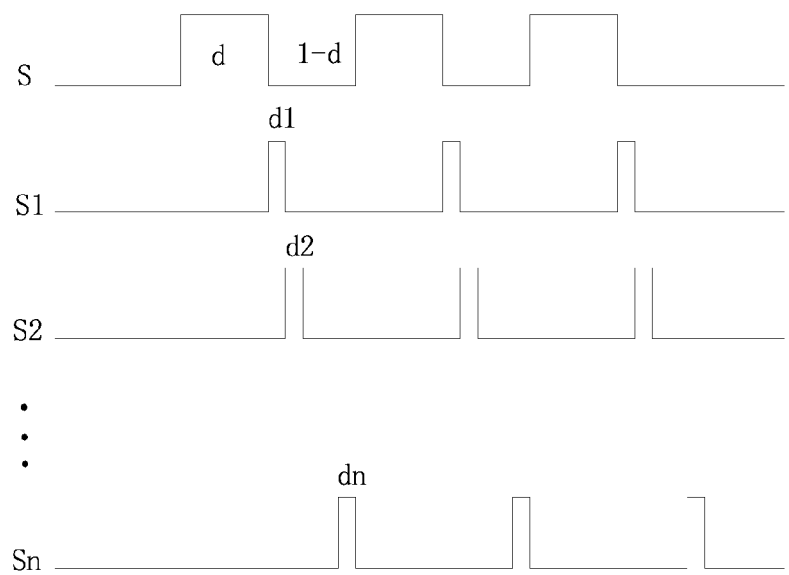
FIG. 4 is a wave diagram of the driving signals of the MOS transistors of the boost circuit in accordance with one embodiment.

The duty ratio of the square-wave signals (S) of the above boost circuit is d. The duty ratio of the square-wave signals (S1-Sn) are d1-dn. Before a turn-off time of each period of the MOS transistor (Q), the number "n" of square-wave signals (S1-Sn) are driven by the number "n" of switch components (Q1-Qn) in turn. In addition, d1+d2+ d3+ . . . +dn=1−d. The waveform diagram of the square-wave signals (S1-Sn) is shown as FIG. 4. The output voltages (Vo1-Von) and the input voltage (Vin) satisfy the equations below:

$$Vo1 = Vin \times \frac{1}{1-a_1 d}, Vo2 = Vin \times \frac{1}{1-a_2 d}, \ldots, Von = Vin \times \frac{1}{1-a_n d};$$

$$\text{wherein, } a_1 = \frac{d1}{1-d}, a_2 = \frac{d2}{1-d}, \ldots, a_n = \frac{dn}{1-d};$$

$$a_1 + a_2 + \ldots + a_n = 1.$$

Figure 5:
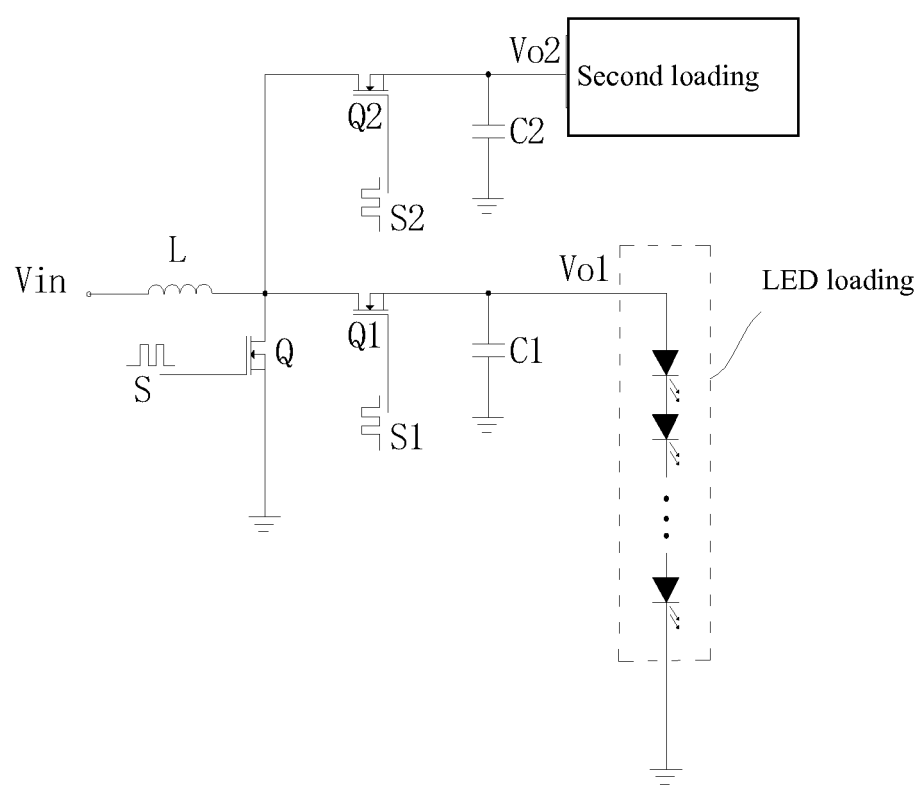
FIG. 5 is a circuit diagram of the LED backlight driving circuit in accordance with one embodiment.

When adopting the above boost circuit in LED backlight driving circuits, the number "n" of the switch components may be determined in accordance with the operational voltages of the backlight driving circuits. Preferably, n is in a range between 2 and 4. FIG. 5 is a circuit diagram of the LED backlight driving circuit in accordance with one embodiment. In one example, the number of the switch components equals to 2.

As shown in FIG. 5, the LED backlight driving circuit includes a boost circuit and at least one LED loading. The boost circuit includes an inductor (L), a MOS transistor (Q), and two MOS transistors (Q1, Q2) adopted as switch components. The first end of the inductor (L) receives one input voltage (Vin), and the second end of the inductor (L) connects to the drain of the MOS transistor (Q). The source of the MOS transistor (Q) is electrically grounded. The gate of the MOS transistor (Q) is driven by one square-wave signals (S). The drains of the MOS transistors (Q1, Q2) respectively connects to the second end of the inductor (L). The source of the MOS transistors (Q1, Q2) respectively outputs voltage (Vo1, Vo2). The gate of the MOS transistors (Q1, Q2) are respectively driven by the square-wave signals (S1, S2). In addition, the source of the MOS transistors (Q1, Q2) are electrically grounded respectively via the capacitors (C1, Cn). The voltage (Vo1) outputted by the switch transistor (Q1) supplies the operational voltage for the LED loading. The voltage (Vo2) outputted by the switch transistor (Q2) supplies the operational voltage for the second loading.

The duty ratio of the square-wave signals (S) of the above LED backlight driving circuit t is d. The duty ratio of the square-wave signals (S1, S2) are respectively d1 and d2. Before a turn-off time of each period of the MOS transistors (Q1, Q2), the square-wave signals (S1, S2) are driven by MOS transistors (Q1, Q2) in turn. In addition, d1+d2=1−d. The output voltage (Vo1, Vo2) and the input voltage (Vin) satisfy the equations below:

$$Vo1 = Vin \times \frac{1}{1-a_1 d}, Vo2 = Vin \times \frac{1}{1-a_2 d};$$

$$\text{wherein, } a_1 = \frac{d1}{1-d}, a_2 = \frac{d2}{1-d}; a_1 + a_2 = 1.$$

In the embodiment, the LED loading of FIG. 5 only shows one LED string, including a plurality of LEDs serially connected. In other embodiments, the LED loading may be a plurality of LED strings connected in parallel.

In view of the above, the LED backlight driving circuit includes one boost circuit having one input voltage and a plurality of output voltages. Only one energy-saving component is adopted, but two or more output voltages may be obtained. Not only the LED string is supplied with the voltage, but also other loadings of the driving circuit may be supplied with the operational voltage. In this way, it is not needed to adopt large-scale energy-saving component, i.e., inductor, such that the cost of the product is reduced.

It should be noted that the relational terms herein, such as "first" and "second", are used only for differentiating one entity or operation, from another entity or operation, which, however do not necessarily require or imply that there should be any real relationship or sequence. Moreover, the terms "comprise", "include" or any other variations thereof are meant to cover non-exclusive including, so that the process, method, article or device comprising a series of elements do not only comprise those elements, but also comprise other elements that are not explicitly listed or also comprise the inherent elements of the process, method, article or device. In the case that there are no more restrictions, an element qualified by the statement "comprises a . . . " does not exclude the presence of additional identical elements in the process, method, article or device that comprises the said element.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A boost circuit, comprising:
    an inductor (L), a MOS transistor (Q), and a number "n" of switch components (Q1-Qn), a first end of the inductor (L) receives an input voltage (Vin), and a second end of the inductor (L) connects to a drain of the MOS transistor (Q), a source of the MOS transistor (Q) is electrically grounded, a gate of the MOS transistor (Q) is driven by one square-wave signals (S), the first ends of the number "n" of switch components (Q1-Qn) respectively connects to the second end of the inductor (L), the second ends of the number "n" of switch components (Q1-Qn) respectively outputs a number "n" of output voltages (Vo1-Von), the number "n" of switch components (Q1-Qn) are driven by a number "n" of square-wave signals (S1-Sn);
    wherein a duty ratio of the square-wave signals (S) is d, the duty ratios of the square-wave signals (S1-Sn) are d1-dn, before a turn-off time of each period of the MOS transistor (Q), the number "n" of square-wave signals (S1-Sn) are driven by a number "n" of switch components (Q1-Qn) in turn, and d1+d2+d3+ . . . +dn=1−d; and
    wherein n is an integer greater than one.

2. The boost circuit as claimed in claim 1, wherein the number "n" of switch components (Q1-Qn) are MOS transistors, the drain of each MOS transistors (Q) respectively connects to the second ends of the inductor (L), the source of each MOS transistors (Q) respectively outputs the number "n" of output voltages (Vo1-Von), and the gate of the MOS transistors (Q) are respectively driven by the number "n" of square-wave signals (S1-Sn).

3. The boost circuit as claimed in claim 2, wherein n is in a range between 2 and 4.

4. The boost circuit as claimed in claim 2, wherein n equals to 2.

5. The boost circuit as claimed in claim 1, wherein n is in a range between 2 and 4.

6. The boost circuit as claimed in claim 1, wherein n equals to 2.

7. A LED backlight driving circuit, comprising:
    a boost circuit and at least one LED loading, the boost circuit comprises:
    an inductor (L), a MOS transistor (Q), and a number "n" of switch components (Q1-Qn), a first end of the inductor (L) receives an input voltage (Vin), and a second end of the inductor (L) connects to a drain of the MOS transistor (Q), a source of the MOS transistor (Q) is electrically grounded, a gate of the MOS transistor (Q) is driven by one square-wave signals (S), the first ends of the number "n" of switch components (Q1-Qn) respectively connects to the second end of the inductor (L), the second ends of the number "n" of switch components (1-Qn) respectively outputs a number "n" of output voltages (Vo1-Von), the number "n" of switch components (Q1-Qn) are driven by a number "n" of square-wave signals (S1-Sn), one of the number "n" of output voltages (Vo1-Von) supplies a driving voltage to the LED loading, and other output voltages supply the driving voltages to other loadings of the LED backlight driving circuit;
    wherein a duty ratio of the square-wave signals (S) is d, the duty ratios of the square-wave signals (S1-Sn) are d1-dn, before a turn-off time of each period of the MOS transistor (Q), the number "n" of square-wave signals (S1-Sn) are driven by a number "n" of switch components (Q1-Qn) in turn, and d1+d2+d3+ . . . +dn=1−d; and
    wherein n is an integer greater than one.

8. The LED backlight driving circuit as claimed in claim 7, wherein the number "n" of switch components (Q1-Qn) are MOS transistors, the drain of each MOS transistors (Q) respectively connects to the second ends of the inductor (L), the source of each MOS transistors (Q) respectively outputs the number "n" of output voltages (Vo1-Von), and the gate of the MOS transistors (Q) are respectively driven by the number "n" of square-wave signals (S1-Sn).

9. The LED backlight driving circuit as claimed in claim 8, wherein the LED loading is a LED string or at least two LED strings connected in parallel, and each of the LED string comprises a plurality of LEDs serially connected.

10. The LED backlight driving circuit as claimed in claim 9, wherein n is in a range between 2 and 4.

11. The LED backlight driving circuit as claimed in claim 9, wherein n equals to 2.

12. The LED backlight driving circuit as claimed in claim 7, wherein the LED loading is a LED string or at least two LED strings connected in parallel, and each of the LED string comprises a plurality of LEDs serially connected.

13. A liquid crystal device, comprising:
    a liquid crystal panel and a backlight module for providing a display light source to the liquid crystal panel such that the liquid crystal panel is capable of displaying images;
    the backlight module comprises a LED backlight source, a driving circuit of the LED backlight source comprises a boost circuit and at least one LED loading, the boost circuit comprises:
    an inductor (L), a MOS transistor (Q), and a number "n" of switch components (Q1-Qn), a first end of the inductor (L) receives an input voltage (Vin), and a second end of the inductor (L) connects to a drain of the MOS transistor (Q), a source of the MOS transistor (Q) is electrically grounded, a gate of the MOS transistor (Q) is driven by one square-wave signals (S), the first ends of the number "n" of switch components (Q1-Qn) respectively connects to the second end of the inductor (L), the second ends of the number "n" of switch components (Q1-Qn) respectively outputs a number "n" of output voltages (Vo1-Von), the number "n" of switch components (Q1-Qn) are driven by a number "n" of square-wave signals (S1-Sn), one of the number "n" of output voltages (Vo1-Von) supplies a driving voltage to the LED loading, and other output voltages supply the driving voltages to other loadings of the LED backlight driving circuit;

wherein a duty ratio of the square-wave signals (S) is d, the duty ratios of the square-wave signals (S1-Sn) are d1-dn, before a turn-off time of each period of the MOS transistor (Q), the number "n" of square-wave signals (S1-Sn) are driven by a number "n" of switch components (Q1-Qn) in turn, and d1+d2+d3+ . . . +dn=1−d; and wherein n is an integer greater than one.

14. The liquid crystal device as claimed in claim 13, wherein the number "n" of switch components (Q1-Qn) are MOS transistors, the drain of each MOS transistors (Q) respectively connects to the second ends of the inductor (L), the source of each MOS transistors (Q) respectively outputs the number "n" of output voltages (Vo1-Von), and the gate of the MOS transistors (Q) are respectively driven by the number "n" of square-wave signals (S1-Sn).

15. The liquid crystal device as claimed in claim 14, wherein the LED loading is a LED string or at least two LED strings connected in parallel, and each of the LED string comprises a plurality of LEDs serially connected.

16. The liquid crystal device as claimed in claim 15, wherein n is in a range between 2 and 4.

17. The liquid crystal device as claimed in claim 15, wherein n equals to 2.

18. The liquid crystal device as claimed in claim 13, wherein the LED loading is a LED string or at least two LED strings connected in parallel, and each of the LED string comprises a plurality of LEDs serially connected.

* * * * *